(12) United States Patent
Wang et al.

(10) Patent No.: US 12,012,922 B2
(45) Date of Patent: Jun. 18, 2024

(54) WAVE ENERGY ABSORBING AND CONVERTING DEVICE AND POWER GENERATION SYSTEM

(71) Applicant: ACADEMY OF SYSTEMS ENGINEERING, PLA ACADEMY OF MILITARY SCIENCES, Beijing (CN)

(72) Inventors: Weijun Wang, Beijing (CN); Bin Li, Beijing (CN)

( * ) Notice: Subject to any disclaimer, the term of this patent is extended or adjusted under 35 U.S.C. 154(b) by 228 days.

(21) Appl. No.: 17/640,780

(22) PCT Filed: Aug. 27, 2020

(86) PCT No.: PCT/CN2020/111557
§ 371 (c)(1),
(2) Date: Mar. 4, 2022

(87) PCT Pub. No.: WO2021/043049
PCT Pub. Date: Mar. 11, 2021

(65) Prior Publication Data
US 2022/0333571 A1 Oct. 20, 2022

(30) Foreign Application Priority Data

Sep. 4, 2019 (CN) .......................... 201910833359.X
Sep. 4, 2019 (CN) .......................... 201910833378.2
Sep. 4, 2019 (CN) .......................... 201910834039.6

(51) Int. Cl.
*F03B 13/18* (2006.01)
*F03B 11/04* (2006.01)
*H02K 7/18* (2006.01)

(52) U.S. Cl.
CPC .......... *F03B 13/1845* (2013.01); *F03B 11/04* (2013.01); *H02K 7/1823* (2013.01); *F05B 2260/964* (2013.01)

(58) Field of Classification Search
CPC ...... F03B 13/1845; F03B 11/04; F03B 13/20; F03B 13/187; F03B 13/22; H02K 7/1823;
(Continued)

(56) References Cited

U.S. PATENT DOCUMENTS 6,109,029 A * 8/2000 Vowles ............... F03B 13/1815
60/497
2007/0257491 A1* 11/2007 Kornbluh ................ F03B 13/20
290/53

(Continued)

*Primary Examiner* — Michael C Zarroli
(74) *Attorney, Agent, or Firm* — Novoclaims Patent Services LLC; Mei Lin Wong

(57) ABSTRACT

A wave energy absorption and conversion device and a power generation system includes a floating body, a guiding shaft, a damping plate and a counteracting mechanism placed in a movement range of the damping plate. The guiding shaft is connected to the bottom of the floating body and passes through the center of the damping plate. The damping plate may slide on the guiding shaft. A counterforce generated by the counteracting mechanism is opposite to a natural moving direction of the damping plate, so that the damping plate can be kept in a relatively static state under a synergistic effect of the counteracting mechanism, and thereby, colliding of damping plate with constraint structures above and below can be prevented when floating body is moving up and down following waves. The power generation system includes the wave energy absorption and conversion device and a power generation system.

11 Claims, 11 Drawing Sheets

(58) Field of Classification Search
CPC .......... F05B 2260/964; F05B 2220/703; F05B 2220/707; F05B 2240/93; Y02A 20/144; Y02E 10/30
See application file for complete search history.

(56) References Cited

U.S. PATENT DOCUMENTS

| | | | |
|---|---|---|---|
| 2007/0266704 A1* | 11/2007 | Bull | E02B 9/08 60/398 |
| 2018/0148140 A1* | 5/2018 | Fernandez Gomez | B63B 21/26 |
| 2019/0120201 A1* | 4/2019 | Dragic | H02K 7/1869 |
| 2019/0360452 A1* | 11/2019 | Qu | F03B 13/1875 |

* cited by examiner

WAVE ENERGY ABSORBING AND CONVERTING DEVICE AND POWER GENERATION SYSTEM

BACKGROUND OF THE PRESENT INVENTION

Field of Invention

The present invention relates to a power generation device, in particular to a wave energy power generation technology.

Description of Related Arts

At present, there are typically following types of energy wave power generation devices:

1. The wave energy is converted into the hydraulic energy to push the turbine connected with the generator to rotate, so that the generator rotates to generate electricity. The water snake wave energy power generation equipment of the Pelamis Wave Energy Company, Scotland and the OPT wave energy power generation device of US Ocean Power Technologies (OPT) Corporation are taken as examples. However, the wave energy power generation device of the structure is relatively complex in design, high in cost and high in maintenance cost. Compared with current dominant thermal power generation and hydroelectric generation, it does not have a cost advantage.

2. The wave energy is converted into flowing compressed air to push the turbine to rotate, so that the generator rotates to generate electricity, i.e., so called oscillating water column power generation. Such a power generation facility is primarily a shore-type device which is simple in structure, reliable in performance and low in maintenance cost. But its energy conversion efficiency is relatively low, and it is greatly constrained by geographical location and is unfavorable to popularize. The most typical floating oscillating water column power generation equipment on the sea is Great Whale which has been actually applied in Japan, which avoids geographical restriction of the shore-type facility. But it is relatively high in cost, and compared with thermal power generation and hydroelectric generation, it still does not have a cost advantage.

3. The wave energy is converted into the mechanical energy to directly push the generator to generate electricity. Theoretically without multiple conversions in energy transmission form, this way avoids energy loss in the conversion process, and the energy conversion ratio is higher than that of the aforementioned two types of wave energy power generation devices. However, as a result of complexity of wave moment as well as impact of surges caused by extreme weather to the device, the reliability of such a system is greatly reduced, so that such a wave energy power generation device is hard to deal with extreme oceanic conditions, and thus, there is no complete sophisticated devices applied so far.

Among the abovementioned three ways, power generation by the water turbine impacted by directly using sea water is a relatively ideal way theoretically, which may reduce the intermediate link of energy absorption and transmission, thereby, the utilization ratio of wave energy is improved. There is a common way that the hydraulic pump is pushed by waves or the piston injects seawater into the shoreside impounding reservoir to enable the water turbine to generate electricity by means of formed fall. Alternatively, wavers are introduced into a higher place by way of retracting the water channel to form fall as well, so that the water turbine generates electricity. The abovementioned two ways have the defect that the wave energy is collected near the shore and is greatly affected by the geographical location.

There is still a floating power generation device on the sea, for example, the WaveEL wave energy power generation device of Sweden. A tubular body of about 20 m long connected with the floating body stretches into the sea perpendicularly, so that the height of the seawater in the tubular body is not affected by waves outside the tube and is kept at a relatively stable height. The water turbine is connected with the tubular body and moves up and down together with the floating body following the waves. The blades of the water turbine move up and down in the seawater in the tubular body to rotate so as to drive the generator to generate electricity. The device is simple in structure and high in reliability. The device is in a totally sealed state and most of the structures are located underwater, so that it is high in storm resistance and corrosion resistance. However, it works merely by means of inertia of the seawater inside, which is relevant to the sizes of the blades of the water turbine, so that the device is relatively low in utilization of wave energy.

The inventor has invented two energy wave power generation devices CN103939270B and CN103939269A, referring to FIG. 1 and FIG. 2. Each of the devices includes the generator mounted in the floating body as well as the water turbine connected with the generator in the floating body via the energy output shaft. The piston pressurizing device is arranged below the floating body. when the floating body drives the piston sleeve and the guiding shaft to move up and down following the waves, the piston and the piston sleeve are kept in relative movement due to inertia and resistance, resulting in relative movement between the piston and the piston sleeve so as to alternatively produce positive pressure and negative pressure in the inner cavity of the piston sleeve, so that the seawater flows back and forth in the running water channel to impact blades of the water turbine in the running water channel back and forth, and therefore, the rotating blades drive the generator to generate electricity. The power generation device solves the problem that an existing wave energy power generation device is complex in structure, relatively high in manufacturing cost and maintenance cost and low in long-term operation reliability.

The device is feasible in principle but has problems in actual operation. As the device is provided with the damping plate underwater, according to a design scheme, the buoyancy force of the damping plate shall be equal to the gravity to guarantee that the damping plate suspends in the middle of the movement range. However, it is an ideal state. In fact, it is impossible to manufacture the damping plate with the buoyancy force equal to the gravity. Furthermore, even if the buoyancy force of the damping plate is equal to the gravity, the position of the damping plate underwater is uncontrollable. Therefore, under an actual circumstance, the damping plate in the water always has a trend of moving upwards or downwards due to its gravity or buoyancy force, and the damping plate is not in the designed middle position and will move towards one end of the movement range automatically, so that when the floating body is driven by waves to move up and down, the damping plate will be inevitably contacted with and collide with the constraint structure or the lower end of the piston sleeve in each cycle of motion, which will lead to loss of relative movement between the piston and the sleeve in a period of time. Thus, the damping plate cannot absorb energy of the waves and loses the effect of capturing the wave energy. In an actual operation experiment, the inventor has found that each cycle of movement of the waves is about 7 seconds, and the time during which the damping plate contacts with the constraint structure to loss relative movement is about 3 seconds, which leads to repeated stall and start of the generator, so that the power generation efficiency of the device is reduced greatly. The inventor has studied and found that under such a circumstance, compared with a theoretical design state, the efficiency is decreased by about 80%; the measured voltage output diagram is as shown in FIG. 3. As shown in the FIG. 3, the voltage output by the device ranges from 0V to 648.2V off and on and it is hard to perform rectifying inversion. Thus, it is hard to utilize the electric energy obtained by the device, and the device is hardly applied in actual condition.

SUMMARY OF THE PRESENT INVENTION

In order to overcome defects in the prior art, the objective of the present invention is to provide an energy wave absorption and conversion device and a power generation system. The wave energy utilization ratio is improved remarkably by means of simple structural improvement.

In order to achieve the abovementioned objective of the present invention, the present invention adopts a technical scheme as follows:

In the first aspect, the present invention provides an energy wave absorption and conversion device, including a floating body, a damping plate and a guiding shaft. The guiding shaft is connected to the bottom of the floating body and passes through from the center of the damping plate. The damping plate may slide on the guiding shaft, i.e., the damping plate sleeves the guiding shaft relatively movably, and the constraint structure is placed above and/or below the damping plate to constrain the movement range of the damping plate on the guiding shaft, and the moving up and down of the floating body together with the guiding shaft under a wave action result in relative movement counter against damping plate which produces kinetic energy for electric power generation system.

The present invention is improved that the counteracting mechanism is set at or near the middle position of the movement range of the damping plate on the guiding shaft to counteract the upward or downward moving trend of the damping plate. The counteracting force of the counteracting mechanism is gravity of the counterweight or the buoyancy force of the buoyancy tank, and the counteracting force is opposite to the natural moving direction of the damping plate. When the damping plate is contacted with the counteracting mechanism, without an external force, the damping plate will stay at the position contacted with the counteracting mechanism, i.e., the damping plate is not able to move up and down automatically. Under the action of waves, the floating body drives the guiding shaft to generate relative movement with the damping plate, and the movement range of the damping plate is located between the upper and lower constraint structures. The damping plate is kept in a relatively static state in the middle position of the movement range on the underwater guiding shaft under the self resistance and synergistic effect of the counteracting mechanism. When the floating body and the guiding shaft move up and down under a certain wave height, the damping plate is not able to reach either the up and lower constrain limits preventing the loss of relative movement.

In the scheme, when the buoyancy force of the designed damping plate is greater than the total gravities (referring to the weight of all structures connected with the damping plate together) of the damping plate itself and the gravity carried thereby, the counterweight is loaded to the damping plate, so that the sum gravity carried by the damping plate with the addition of the counterweight is greater than the sum of the buoyancy forces thereof. The combination of damping plate (9) with the counterweight happens when the damping plate moving up to the middle position from the lower end of the movement range thereof, this combination is not firm and they just lean against each other. Without the action of an external force, a combined body stays at the initially combined position, i.e., the middle position of the movement range. With the action of the external force, the combined body may move upwards continuously together. As the gravity of the combined body is greater than the buoyancy force, the natural moving trend becomes downwards, which weakens the ascending kinetic energy of the combined body. Under a certain wave height, the colliding between damping plate and the lower constraint structure is prevented and the loss of relative movement between damping plate and the floating body is prevented as well and it starts to move downwards before collision. When the combined body moves downwards to the initially combined position, the damping plate is naturally separated from the counterweight.

In the scheme, when the gravity of the designed damping plate itself and the gravity carried thereby are greater than the buoyancy force of the damping plate, the buoyancy bank is placed to the damping plate, so that the sum buoyancy force of the damping plate and the buoyancy tank is greater than the sum gravity carried thereby. When moving to the middle position from the upper end of the movement range to the lower end thereof, the damping plate is combined with the buoyancy tank. Without the action of the external force, the combined body stays at the initially combined position, i.e., the middle position. With the action of the external force, the combined body may move downwards continuously together. As the buoyancy force of the combined body is greater than the gravity, the natural moving trend becomes upwards, which weakens the descending kinetic energy of the combined body. Under a certain wave height, the colliding between damping plate and the lower constraint structure is prevented and the loss of relative movement between damping plate and the floating body is prevented as well, and it starts to move upwards before collision. When the combined body moves upwards to the initially combined position, the damping plate is naturally separated from the buoyancy tank.

Further, in the present invention, when the counterweight is loaded to the damping plate, the counterweight is dangled above the damping plate with the soft chain and is located in the middle area of the movement range of the damping plate. The soft chain is connected with the guiding shaft or a certain part integrated with the guiding shaft or moving together with the guiding shaft. The soft chain may be at any length, preferably a length to enable the counterweight to be located in the middle position of the movement range of the damping plate. The connecting mode of the counterweight is one of choices of the present invention rather than the unique choice.

When the damping plate is provided with the buoyancy tank, the buoyancy tank is pulled and connected below the damping plate with the soft chain. Under the downward pulling action of the soft chain, the buoyancy tank is suspended below the damping plate. The soft chain is connected with the guiding shaft or a certain part integrated with the guiding shaft or moving together with the guiding shaft. The soft chain may be at any length, preferably a length to enable the buoyancy tank to be located in the middle position of the movement range of the damping plate. The connecting mode of the buoyancy tank is one of choices of the present invention rather than the unique choice.

Further, with respect to the constraint structure, in the present invention, the constraint structure may specifically be a structure placed on the upper part and/or the lower part of the guiding shaft or a certain part integrally fixed on the floating body used as the constraint structure, and the structure and the part are located above and/or below the damping plate to constrain the movement range of the damping plate in a state that the counteracting mechanism is not loaded The abovementioned wave energy absorption and conversion device designed by the present invention has a relatively wide application range, for example, it may be used for improving the wave energy power generation devices in the previous inventions CN103939270B and CN103939269A of the applicant.

Therefore, the invention further provides a wave energy electric power generation system. The improved power generation system is comprised of the wave energy absorption and conversion device and the power generation system. The power generation system is arranged at a power output end of the wave energy absorption and conversion device to convert wave energy into electric energy.

In the power generation system, the power generation system may be in various forms:

The power generation system may be the piston pressurizing water turbine power generation device which includes a generator mounted in the floating body and connected with the water turbine via an energy transfer shaft, wherein a piston pressurizing device is arranged below the floating body. The piston pressurizing device is located under the water surface and includes a piston sleeve and a piston mounted in fit with the piston sleeve, wherein the guiding shaft passes through the piston sleeve and the piston. The piston sleeve is connected below the floating body, and the water turbine is located in the opened running water channel at the top of the piston sleeve. The bottom of the piston is in rigid connection with the damping plate, and the plate area is greater than that of the bottom of the piston.

When the floating body drives the piston sleeve and the guiding shaft to move up and down following the waves, the piston and the piston sleeve are kept in relative movement due to a synergistic effect of the counteracting mechanism of the piston and the damping plate so as to alternatively produce positive pressure and negative pressure in the inner cavity of the piston sleeve, so that the seawater flows back and forth in the running water channel to impact blades of the water turbine in the running water channel back and forth, and therefore, the rotating blades drive the generator to generate electricity.

The power generation system may be an oil pump hydraulic motor power generation device which includes a hydraulic pump mounted in the floating body, a hydraulic motor and a generator. A push rod of the hydraulic pump is connected with the damping plate via a transmission piece, the floating body and the damping plate generate a relative movement under the action of the waves, and a piston motion in the hydraulic pump is pushed by the transmission piece and the push rod, a liquid in the hydraulic pump pushes the hydraulic motor so as to drive the generator to generate electricity.

The power generation system may further be a linear motor or a magnetic motor. When the linear motor power generation mechanism is used, it includes a linear motor stator, the push rod and a linear motor sliding part, wherein the linear motor stator is fixed in the floating body, the linear motor sliding part is matched with the linear motor stator and slides relative to the linear motor stator, and the push rod is connected with and drives the linear motor sliding part and is connected with the damping plate via the transmission piece; and the floating body and the damping plate generate a relative movement under the action of waves, and the linear motor sliding part is driven by the transmission piece and the push rod to move up and down relative to the linear motor stator so as to generate electric energy.

It may be seen from the abovementioned description that the present invention designs a wave energy absorption and conversion device with high energy wave utilization ratio. A force counteracting with the buoyancy force or the gravity of the damping plate is placed to the middle position of the movement of the damping plate, so that the damping plate moves to the position due to its buoyancy force or gravity. The counteracting force is loaded thereto to prevent self-movement of the damping plate, and the damping plate is suspended to the place where the counteracting force is loaded. The place is usually located in the middle area of the movement range thereof. In the presence of the counteracting mechanism, the damping plate loses the natural power to move towards two ends of the movement range. Hence, when the floating body and the guiding shaft are driven by waves to move, as long as the wave height is within a designed range, the damping plate moves up and down around a combining point as a core to be prevented from colliding with and being contacted with the constraint structure or the floating body, so that the floating body and the damping plate are kept in relative movement all the time so as to absorb and convert wave energy uninterruptedly.

The present invention has the advantages of high wave energy utilization ratio, simple structure, reliable operation, high storm and corrosion resistance, easy maintenance and the like, and may lower the power generation cost of the wave energy, enhance the competitiveness compared with conventional energy production and meet the electricity demands of power supply of remote islands on the sea and sea water desalination.

Figure 1:
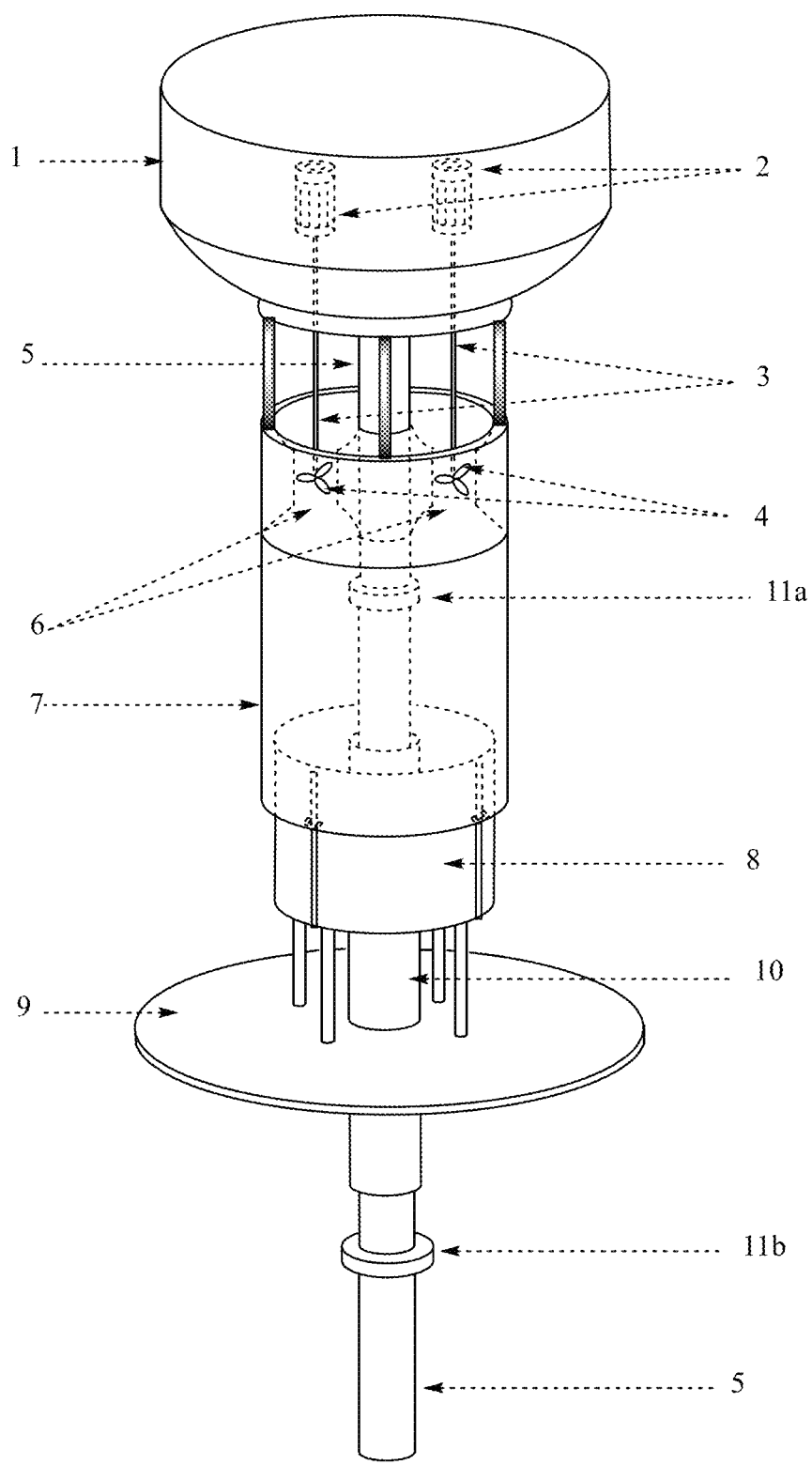
FIG. 1 is a diagram of a wave energy power generation device in the prior art (CN103939270A).
Figure 2:
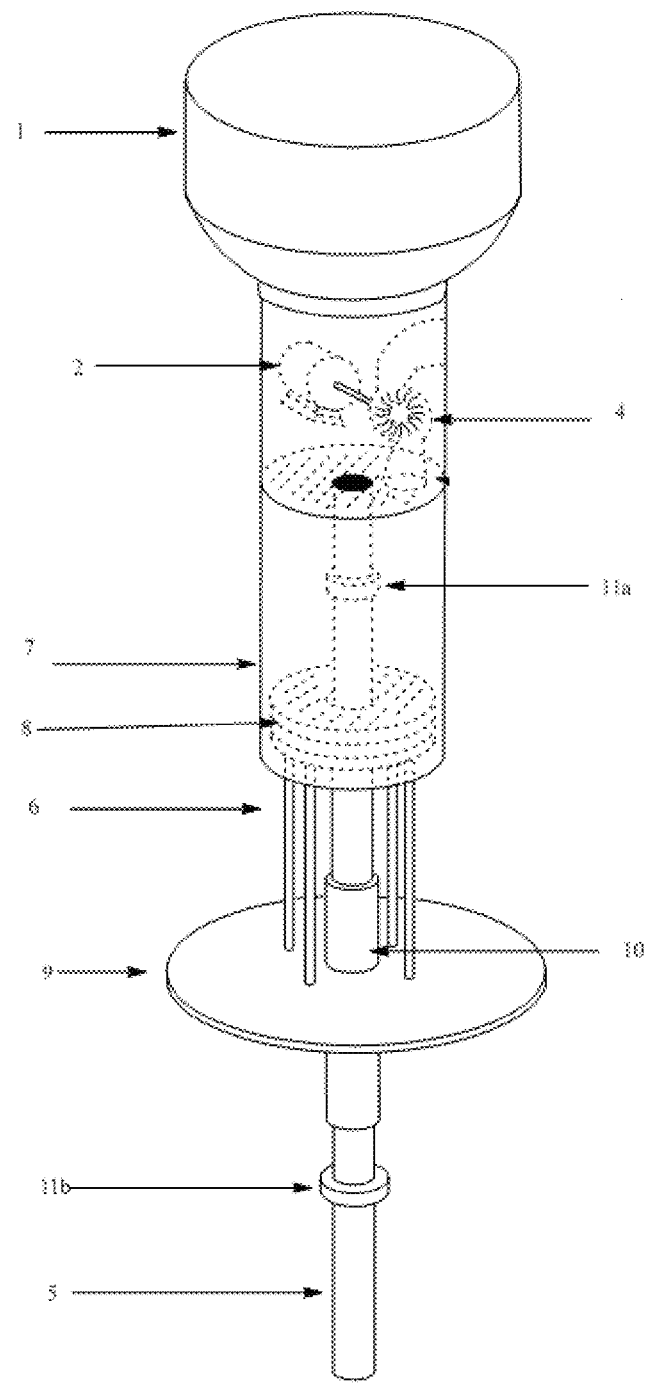
FIG. 2 is a diagram of a wave energy power generation device in the prior art (CN103939269B).
Figure 3:
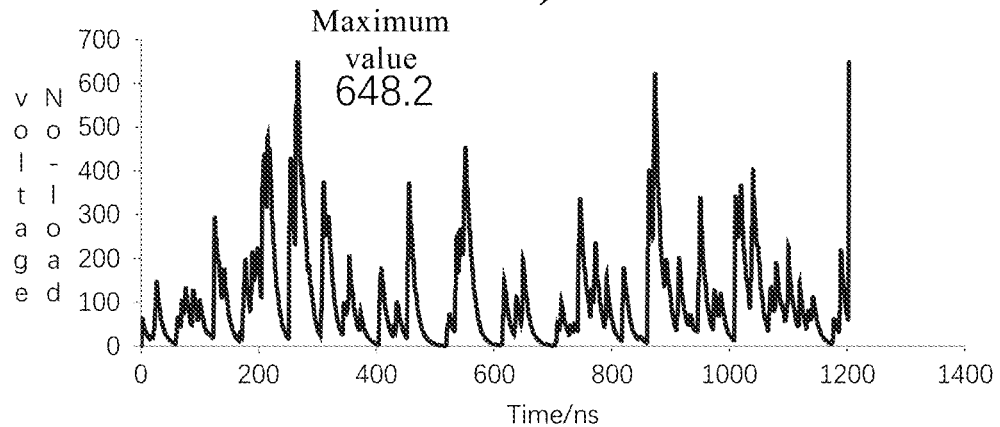
FIG. 3 is a voltage output diagram of a wave energy power generation device in the prior art (CN103939270A).

In the drawings, 1, floating body; 2, generator; 3, energy output shaft; 4, water turbine; 5, guiding shaft; 6, running water channel; 7, piston sleeve; 8, piston; 9, damping plate; 10, center shaft sleeve; 11a, upper constraint structure; 11b, lower constraint structure; 12, guiding groove; 13, power generation system; 14a, counterweight; 14b, buoyancy tank; 15, push rod; 16, hydraulic pump; 17, hydraulic motor; 18, linear motor stator; 19, linear motor sliding part.

DETAILED DESCRIPTION OF THE PREFERRED EMBODIMENT

Further description of the present invention will be made below in combination with the drawings and a plurality of non-defining embodiments.

Example 1

Figure 5:
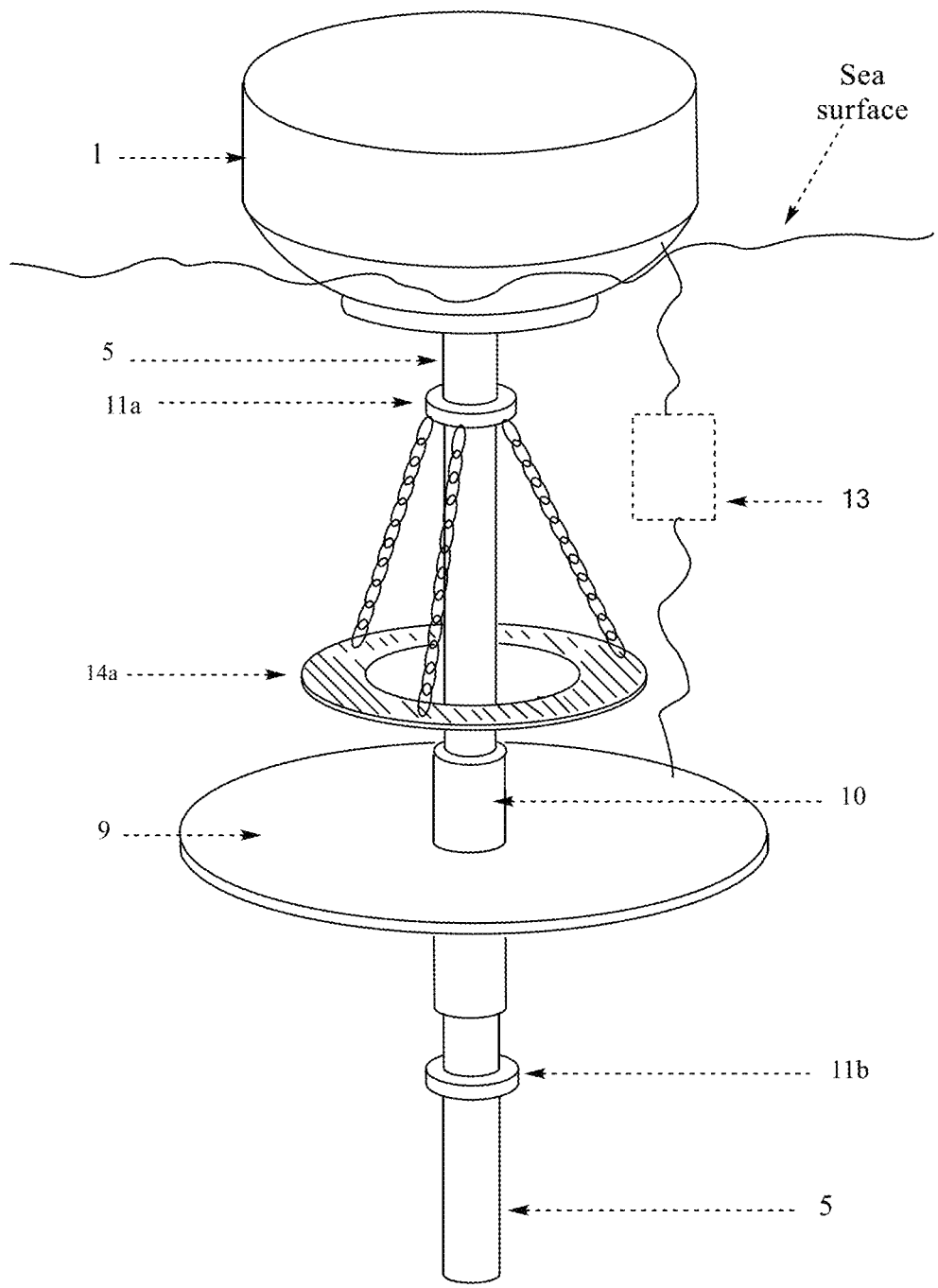
FIG. 5 is a schematic diagram of a structure principle of an energy wave absorption and conversion device of the present invention (the counteracting mechanism is the counterweight).

Referring to FIG. 5, in the embodiment, the energy wave absorption and conversion device includes components such as a floating body 1, a damping plate 9, a guiding shaft 5 and a counteracting mechanism. The guiding shaft 5 is connected to the bottom of the floating body 1 and the guiding shaft 5 passes through a center of the damping plate 9 perpendicularly. The damping plate may slide on the guiding shaft 5 freely. The constraint structures 11a and 11b are placed on the upper portion and the lower portion of the guiding shaft 5 to constrain the movement range of the damping plate 9 between the two constraint structures 11a and 11b, and the moving up and down of the floating body 1 together with the guiding shaft 5 under a wave action result in relative movement counter against damping plate 9 which produces kinetic energy for electric power generation system (the part shown by a dotted line in the drawing, and it is to be noted that this is schematic and does not reflect a true structural connecting relationship).

In the embodiment, the counteracting mechanism is set at or near the middle position of the movement range of the damping plate to counteract the upward or downward moving trend of the damping plate. The counteracting force of the counteracting mechanism is originated from the gravity of the counterweight 14a specifically arranged or the buoyancy force of the buoyancy tank 14b specifically arranged.

In the embodiment, as the sum buoyancy force of the damping plate 9 and the buoyancy force of the load added thereto (such as the piston 8) is approximately greater than the sum gravity thereof, it is necessary to place the counterweight 14a above the damping plate 9 as the counteracting mechanism at the time. The counteracting force of the counterweight 14a is opposite to the natural moving direction of the damping plate 9, so that the damping plate 9 is kept in a relatively static state underwater in the middle position of the movement range thereof under the damping action of the damping plate itself and the synergistic effect of the counteracting mechanism. When the floating body and the guiding shaft move up and down under a certain wave height, the damping plate is not able to reach the up constrain limit (11a) preventing the loss of relative movement, so that moving stagnation and failure are prevented.

Example 2

Figure 7:
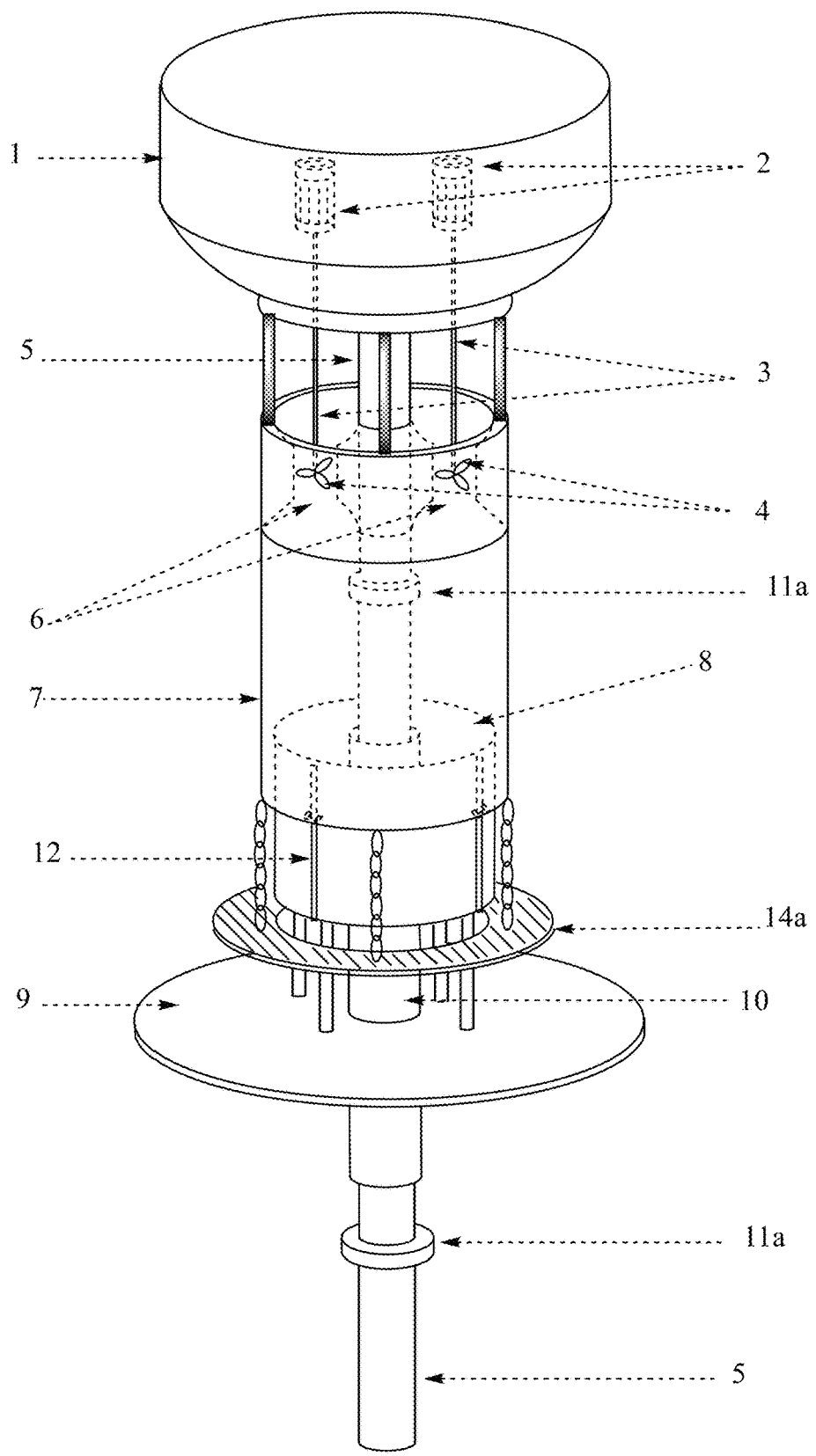
FIG. 7 is a schematic diagram of a specific implementation structure of a power generation device of the present invention.

The structure of the embodiment 1 is combined with the piston pressurizing water turbine power generation system to obtain a specific wave energy electric power generation system as shown in FIG. 7. The piston pressurizing water turbine power generation device of the system is provided with a generator 2, a water turbine 4, a piston pressurizing device and the like. Specifically, the generator 2 is mounted in the floating body 1, and the water turbine 4 and the piston pressurizing device are mounted below the floating body 1.

The piston pressurizing device of the system includes the piston 8, the piston sleeve 7 and the like. The piston sleeve 7 is connected below the floating body 1, and the top thereof is provided with the opened running water channel 6. Seawater may enter the sleeve via the running water channel 6. The water turbine 4 is located in the running water channel 6 located at the top of the piston sleeve 7 and is connected with the generator 2 in the floating body 1 via the energy output shaft 3 thereof, thereby providing power to the generator 2.

The guiding shaft 5 at the bottom of the floating body 1 passes through the piston sleeve 7 below the floating body 1 and the piston 8 mounted in fit with the piston sleeve 7 as well as the center of the damping plate 9 to guide and constrain the movements thereof. The guiding shaft 5 is provided with two constraint structures, wherein the upper constraint structure 11a is located in the piston sleeve 7 and the lower constraint structure 11b is located out of the piston sleeve 7. The guiding shaft 5 between the two constraint structures 11a and 11b is provided with the piston 8 via the center shaft sleeve 10, the piston 8 is in rigid connection with the damping plate 9 below, and the piston 8 and the damping plate 9 may move up and down together along the center guiding shaft 5. The counterweight 14a arranged above the damping plate 9 is dangled at the lower end of the piston sleeve 7 via the soft chain, and the length of the soft chain enables the counterweight 14a to be located in the middle position of the movement range of the damping plate 9 or near the movement range of the damping plate. The gravity of the counterweight 14a counteracts with the naturally upward moving force of the damping plate 9, so that the damping plate 9 may reach a relatively static state in water under the resistance of the damping plate itself and the synergistic effect of the counteracting mechanism. Thus, the damping plate will neither collide with the upper and lower constraint structures 11a and 11b within the designed wave height range (when the device is designed, the relative moving range of the floating body and the damping plate is matched with a usual wave height applied by the device) nor collide with the floating body 1 or other parts such as the piston sleeve 7 in the embodiment moving together with the floating body 1, so as to avoid stagnation and failure of the relative movement, thereby improving the energy conversion efficiency.

By adopting the power generation system, when the floating body 1 drives the piston sleeve 7 and the guiding shaft 5 to move up and down following the the waves, the piston 8 is kept in a relatively static state under the synergistic effect of the damping plate 9 and the counterweight 14a due to inertia and resistance. The relatively static state is realized by means of joint action of the damping plate 9 and the counterweight 14a, thereby resulting in uninterrupted relative movement between the piston 8 and the piston sleeve 7 so as to form alternate positive pressure and negative pressure of seawater in the inner cavity of the piston sleeve 7, so that the seawater flows back and forth in the running water channel 6 to impact blades of the water turbine 4 in the running water channel 6 back and forth, and therefore, the rotating blades drive the generator 2 to generate electricity continuously and stably.

Figure 4:
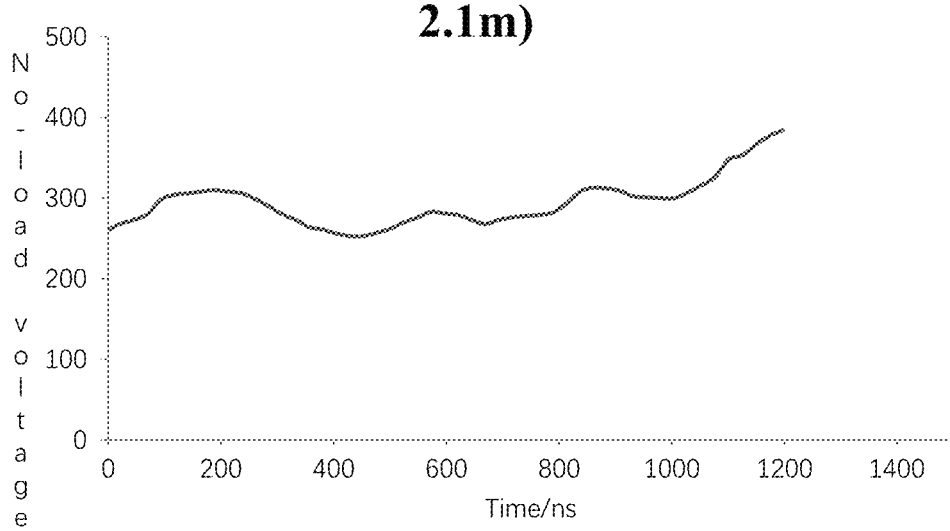
FIG. 4 is a voltage output diagram of a wave energy power generation device in the present invention.

Referring to FIG. 4, it is shown by an experiment that the voltage output by the improved system is within a range of 260V to 400V with continuous and steady wave forms, which indicates good power generation continuity and obviously improved power generation efficiency.

It is to be noted that the arrangement mode of the counteracting mechanism adopted by the embodiment is once of choices of the present invention rather than a limiting condition to the present invention.

Example 3

Figure 6:
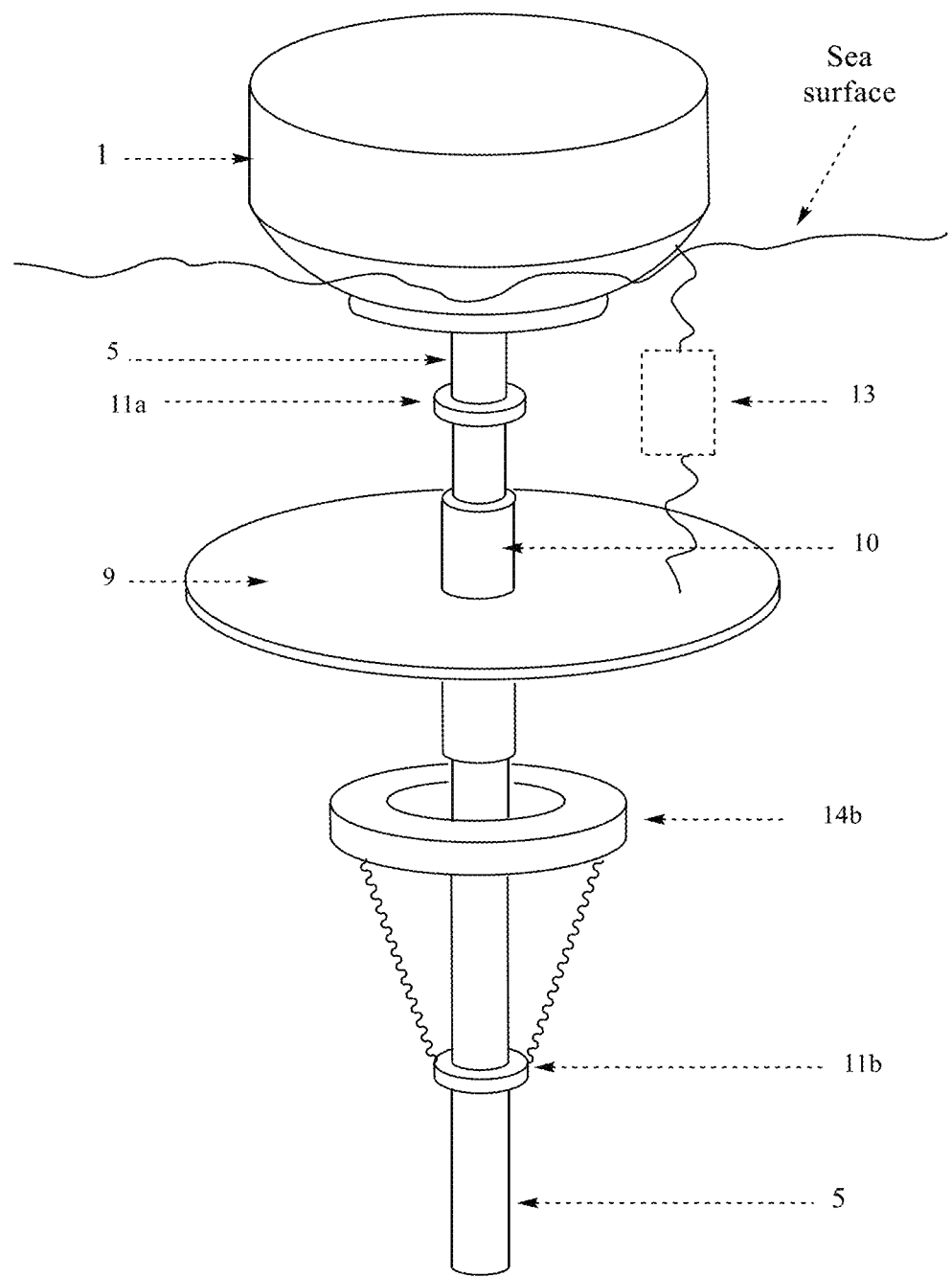
FIG. 6 is a schematic diagram of a structure principle of an energy wave absorption and conversion device of the present invention (the counteracting mechanism is the buoyancy tank).

Referring to FIG. 6, the embodiment is directed to a circumstance that the sum of the buoyancy force of the damping plate 9 and the buoyancy force of the piston 8 loaded to the damping plate is approximately smaller than the gravity. At the time, it is necessary to arrange the buoyancy tank 14b below the damping plate 9 to counteract the downward moving trend of the damping plate. The buoyancy tank 14b is connected and pulled below the damping plate 9 with the soft chain. Under the downward pulling action of the soft chain, the buoyancy tank 14b is suspended below the damping plate 9. The length of the soft chain is to enable the buoyancy tank 14b to be located in the middle position of the movement range of the damping plate 9. When moving to the middle position from the upper end of the movement range to the lower end thereof, the damping plate 9 is combined with the buoyancy tank 14b. Without the action of the external force, the combined body stays at the initially combined position. With the action of the external force, the combined body may move downwards continuously together. As the buoyancy force of the combined body is greater than the gravity, the natural moving trend becomes upwards, which weakens the downward moving kinetic energy of the combined body. Under a certain wave height set by the system, the colliding between damping plate 9 and the lower constraint structure 11b is prevented and the loss of relative movement between damping plate 9 and the floating body 1 is prevented as well, and it starts to move upwards before collision as a result of the action of the counteracting force. When the combined body moves upwards to the initially combined position, the damping plate is naturally separated from the buoyancy tank 14b so as to gain a continuous reciprocating motion, thereby outputting stable wave energy to the generator.

Example 4

Figure 8:
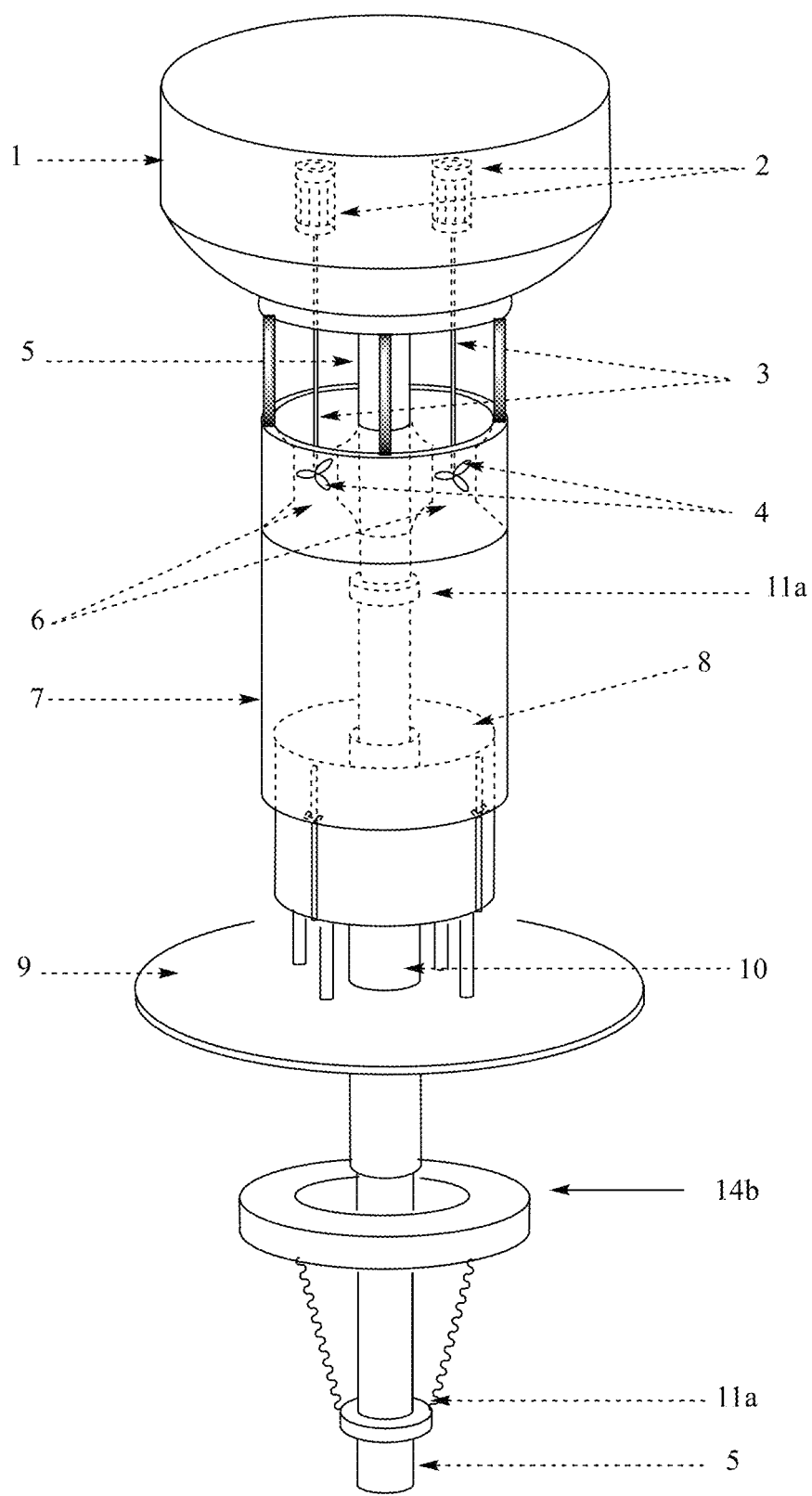
FIG. 8 is a schematic diagram of another specific implementation structure of a power generation device of the present invention.

Similarly, the structure of the embodiment 3 is combined with the piston pressurizing water turbine power generation system to obtain another specific wave energy electric power generation system as shown in FIG. 8. Similarly, the piston pressurizing water turbine power generation device of the device is provided with a generator 2, a water turbine 4, a piston pressurizing device and the like. The generator 2 is mounted in the floating body 1, and the water turbine 4 and the piston pressurizing device are mounted below the floating body 1. The structure of the part is as same as that in the embodiment 2, which is no longer described in detail. The difference is that the counteracting mechanism, i.e., the buoyancy tank 14b is arranged below the damping plate 9.

Example 5

Figure 9:
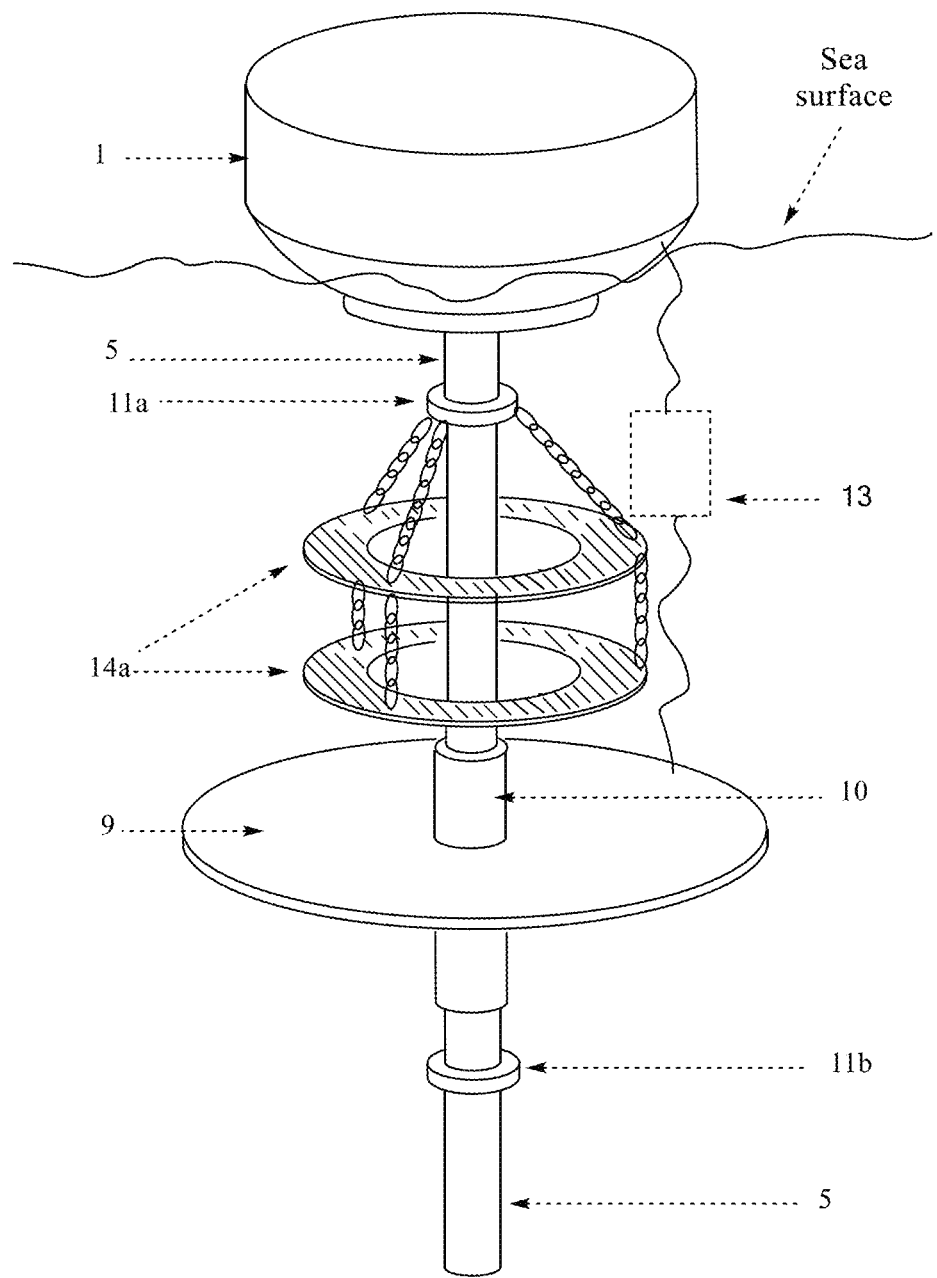
FIG. 9 is a schematic diagram of a structure principle of an energy wave absorption and conversion device of the present invention adopting a multistage counteracting mechanism.

With respect to the devices in the embodiment 1 and the embodiment 3, when the wave height is far greater than an ideal working wave height range designed by the device, the damping plate still has a probability of colliding with the constraint structures, the floating body or other parts moving together with the floating body. Thus, under this circumstance, a further improved counteracting mechanism scheme may be adopted as shown in FIG. 9. By adopting the method of loading the counterweight (or the buoyancy tank) in multiple stages, one counterweight (or a plurality of counterweights according to circumstances) is increased, and the counterweights are connected by the soft chains or in other ways. By means of the scheme, the probability that the damping plate collides with the constraint structures is further reduced.

Example 6

Figure 10:
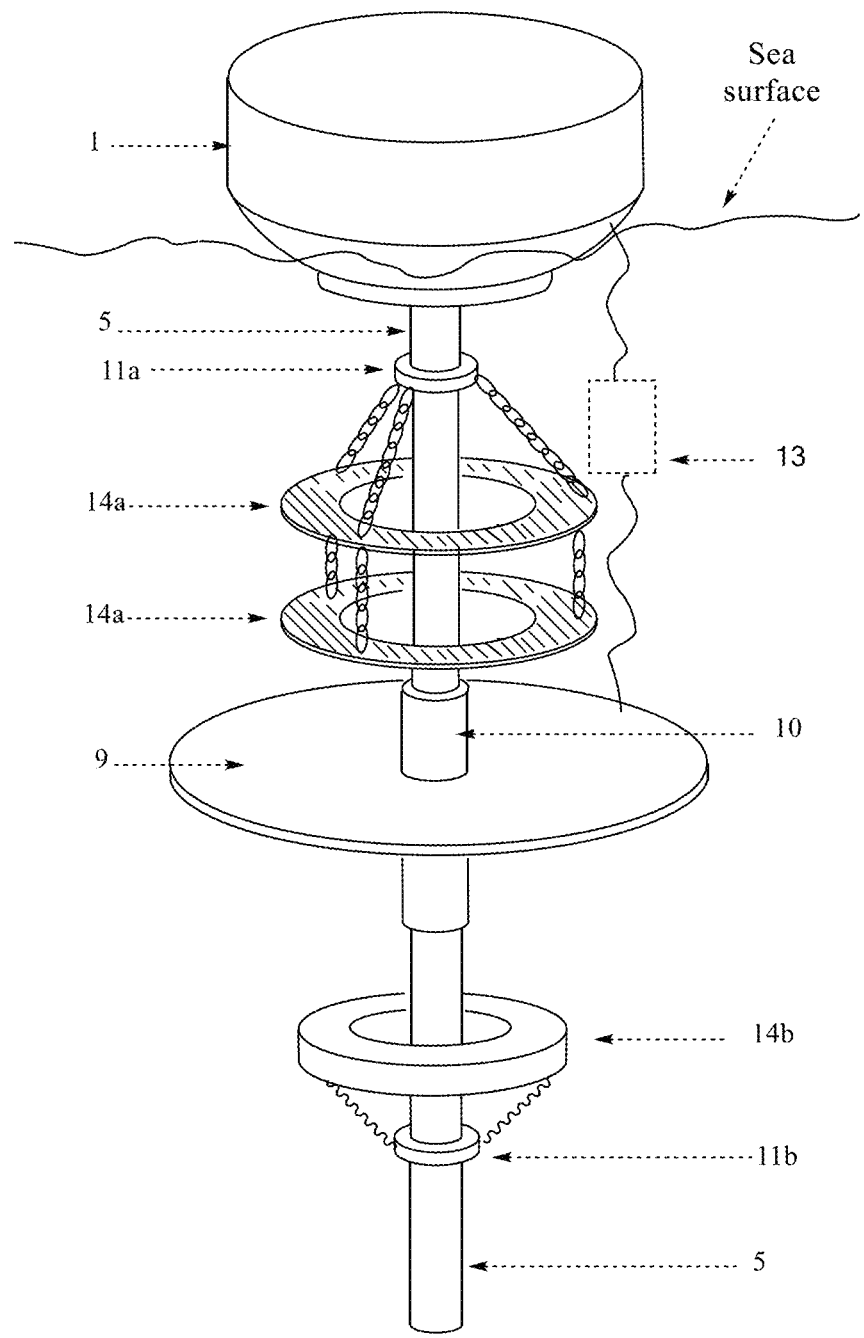
FIG. 10 is a schematic diagram of a structure principle of an energy wave absorption and conversion device of the present invention adopting a mixed multistage counteracting mechanism.

Referring to FIG. 10, with respect to more complex scenes where the device is applied, in order to apply a reasonable counteracting force to the damping plate, a mixed and multistage loading way may be further adopted. Either the counterweight or the buoyancy tank is loaded. Both the counterweight and the buoyancy tank may be arranged in multiple stages. The counterweight shown in FIG. 10 is two-stage.

Therefore, with respect to the counteracting mechanism 14 of the present invention, the abovementioned loading ways are basic ways listed by the patent and are not limited to these disclosed loading ways. A counteracting force opposite to the natural moving direction of the damping plate is loaded in any way to the damping plate 9 in the middle area of the movement range of the damping plate 9 to guarantee that the damping plate moves in the middle area of the movement range of the damping plate when the relative movement is generated between the damping plate and the guiding shaft by waves so as to prevent the colliding of the damping plate 9 with the upper constraint structure 11a or the floating body 1 is prevented and the loss of relative movement is prevented as well.

Example 7

Figure 11:
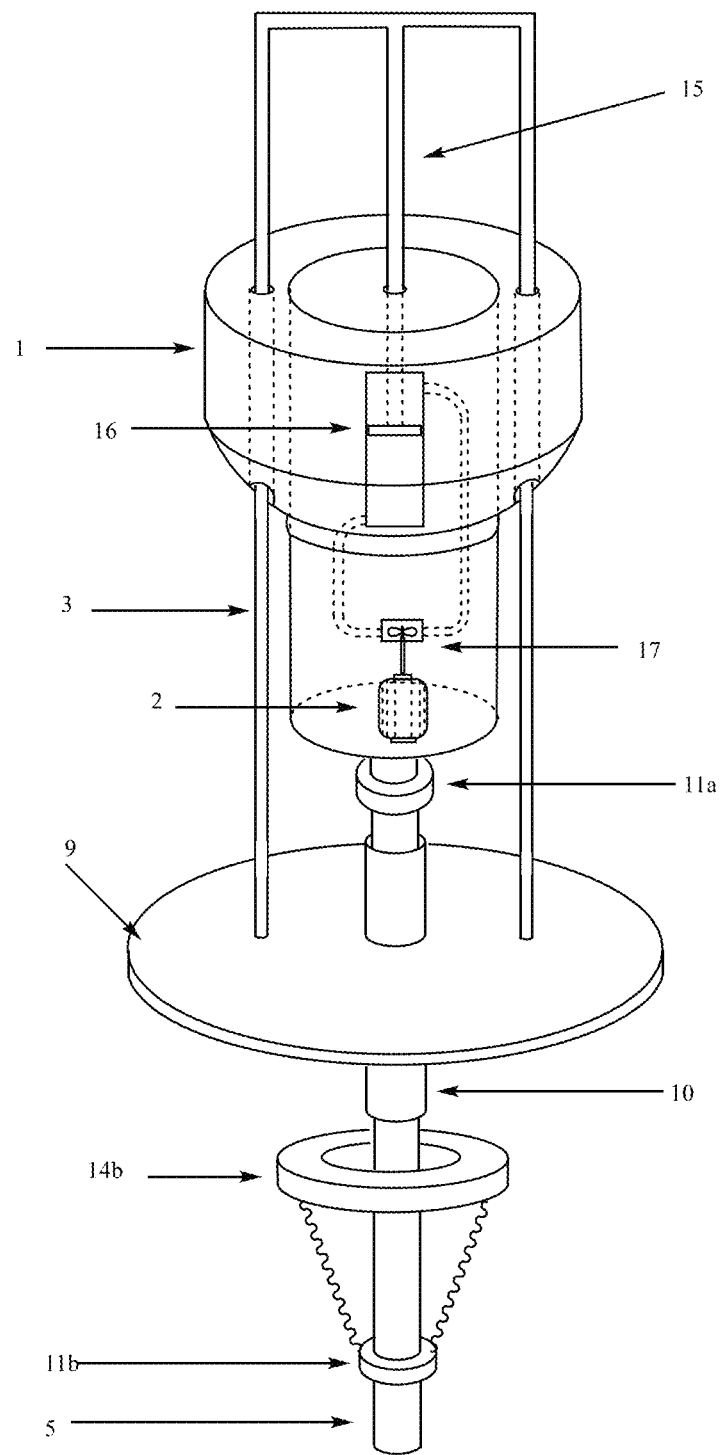
FIG. 11 is a structural diagram of a wave energy power generation device with a power generation system being an oil pump hydraulic motor power generation device.

Referring to FIG. 11, in the embodiment, the power generation system is an oil pump hydraulic motor power generation device which includes a hydraulic pump 16 mounted in the floating body 1, a hydraulic motor 17 and a generator 2. A push rod 15 of the hydraulic pump 16 is connected with the damping plate 9 via a transmission piece 3, the floating body 1 and the damping plate 9 generate a relative movement under the action of the waves, a piston in the hydraulic pump 16 is pushed to move by the transmission piece 3 and the push rod 15, and a liquid in the hydraulic pump flows through the hydraulic motor 17 so as to drive the generator 2 to generate electricity.

Example 8

Figure 12:
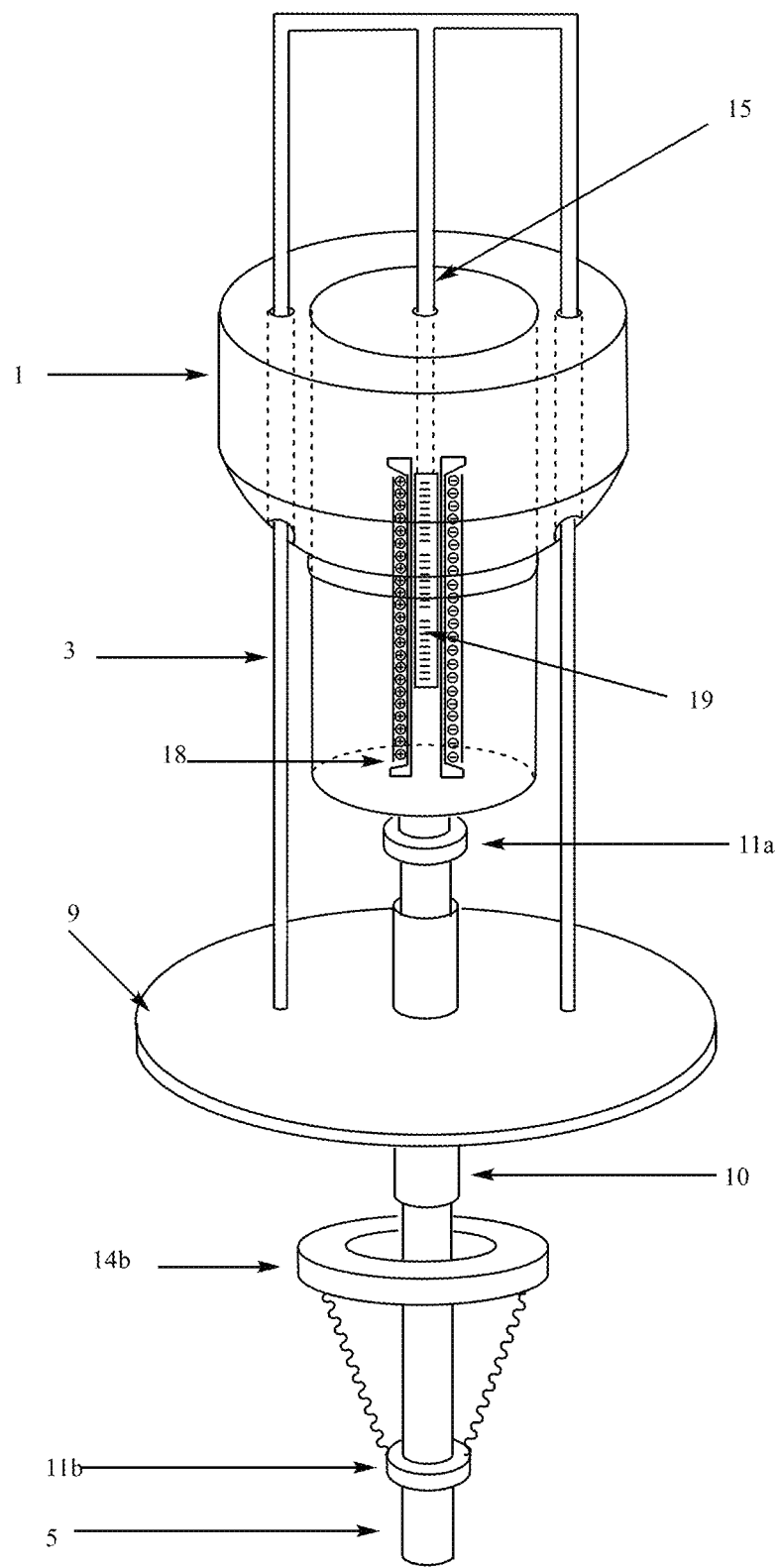
FIG. 12 is a structural diagram of a wave energy power generation device with a power generation system being a linear motor.

Referring to FIG. 12, in the embodiment, the power generation system is a linear motor power generation mechanism which includes a linear motor stator 18, a push rod 15 and a linear motor sliding part 19. The linear motor stator 16 is fixed in the floating body 1, and the linear motor sliding part 19 is matched with the linear motor stator 18 to slide relatively so as to generate electric energy. The push rod 15 is connected with the damping plate 9 via the transmission piece 3, and the push rod 15 passes through the floating body 1 and is connected with and drives the linear motor sliding part 19. Under the action of waves, when the floating body 1 and the damping plate 9 generate a relative movement, the linear motor sliding part 19 will be driven by the transmission piece 3 and the push rod 15 to move up and down relative to the linear motor stator 18 so as to generate electric energy.

The power generation system shown in the embodiments 2, 4 7 and 8 are merely several specific applications of the energy absorption and conversion device. Output of the wave energy may further be combined with other power generation forms, thereby, the wave energy is converted into electric energy. In addition, the abovementioned power generation systems may transmit the electric energy out via power output lines or facilities with similar functions after acquiring the electric energy online, which are routine technologies.

It may be seen from the above embodiments that most structures of the wave energy absorption and conversion device and the power generation system disclosed in the present invention are below the horizontal plane, and in particular, the structures of relative movement are under the water surface. They are good in storm resistance, so that the reliability is high. The power generation devices and the control parts are sealed in the floating body, so that they may be prevented from being corroded by seawater effectively, and therefore, the maintenance cost is lowered.

In conclusion, the device and system provided by the present invention are simple in structure and low in manufacturing cost and maintenance cost, improve the wave energy utilization ratio and improve the long-term operation reliability.

Limited several embodiments are given above to explain thought of the present invention. Apparently, all the described embodiments are merely a part of embodiments of the present invention and are not all the embodiments. On a basis of the design scheme in the present invention, all other embodiments obtained by those of ordinary skill in the technical field without creative efforts fall into the scope of protection of the present invention.

What is claimed is:

1. A wave energy absorption and conversion device, which comprises a floating body (1), a guiding shaft (5) being connected to the bottom of the floating body (1), a damping plate (9) relatively movably sleeving the guiding shaft (5), an upper constraint structure and a lower constraint structure being placed above and below the damping plate (9) respectively to constrain a movement range of the damping plate (9) on the guiding shaft (5) and defining an upper constrain limit and a lower constrain limit of the damping plate (9) respectively, and moving up and down of the floating body (1) together with the guiding shaft (5) under a wave action result in relative movement counter against the damping plate (9) which produces kinetic energy for electric power generation system, being characterized in that:

a counteracting mechanism (14) is set at or near a middle position of the movement range of the damping plate to counteract an upward or downward moving trend of the damping plate (9); a counterforce of the counteracting mechanism (14) is gravity of a counterweight (14a) or a buoyancy force of a buoyancy tank (14b); the counterforce is opposite to a natural moving direction of the damping plate (9), so that the damping plate (9) is kept in a relatively static state underwater in the middle position of the movement range on the guiding shaft; when the floating body and the guiding shaft move up and down under a certain wave height, the damping plate is not able to reach either the upper and lower constrain limits preventing the loss of relative movement, a buoyancy force of the damping plate (9) is designed to be greater than the total gravity carried thereby, the upward moving trend of the damping plate is counteracted, and the counterweight (14a) is loaded on the damping plate, so that the sum of gravity of the damping plate (9) with the addition of the counterweight (14a) is greater than the sum of buoyancy forces thereof; the combination of damping plate (9) with the counterweight (14a) happens when the damping plate (9) moving up to the middle position from the lower end of the movement range thereof, as an opposite acting force of the counterweight (14a) counteracts the redundant buoyancy force of the damping plate, i.e., weakens an ascending kinetic energy of a combined body, the combined body stays at the middle position of movement range, i.e., an initial combined position or vicinity, and the damping plate moves in the middle areas of other movement ranges when relative movement is generated between the damping plate and the guiding shaft by waves, so that in a certain wave range, the colliding between damping plate (9) and the upper constraint structure (11a) and is prevented and a loss of relative movement between damping plate (9) and floating body (1) is prevented, and a total carried gravity of the damping plate (9) is designed to be greater than the buoyancy force thereof, the downward moving trend of the damping plate is counteracted, and the buoyancy tank (14b) is placed below the damping plate (9), so that the sum of the buoyancy forces of the damping plate (9) and the buoyancy tank (14b) is greater than the sum of gravities carried thereby; the damping plate (9) is combined with the buoyancy tank (14b) when moving to the middle position from the upper end of the movement range thereof to the lower end, as an upward acting force of the buoyancy tank (14b) weakens the descending kinetic energy of the combined body, i.e., counteracts redundant gravity of the damping plate, the combined body stays at the middle position of movement of the damping plate, i.e., an initial combined position or vicinity, and the damping plate moves in the middle areas of other movement ranges when relative movement is generated between the damping plate and the guiding shaft by waves, so that under a certain wave height, the colliding between damping plate (9) and the lower constraint structure (11b) is prevented and the loss of relative movement between damping plate (9) and floating body (1) is prevented as well.

2. The wave energy absorption and conversion device according to claim 1, characterized in that the counterweight (14a) is dangled above the damping plate (9) with a soft chain, the buoyancy tank (14b) is pulled and suspended below the damping plate (9) with a soft chain, and the soft chain is connected with the guiding shaft (5) or a certain part integrated with the guiding shaft (5) and moving together with the guiding shaft; and the soft chain may be any length, preferably a length enabling the counterweight (14a) or the buoyancy tank (14b) to be located in the middle position of the movement range of the damping plate (9).

3. The wave energy absorption and conversion device according to claim 2, characterized in that the counteracting mechanism (14) adopts a multistage loading way, i.e., a plurality of counterweights (14a) or a plurality of buoyancy tanks (14b) are loaded, each of the counterweights or each of the buoyancy tanks being connected together with the soft chains in sequence or the counteracting mechanism (14) adopts a mixing and multistage loading way, i.e., either one or more of counterweights (14a) or one or more of buoyancy tanks (14b) are loaded, each of the counterweights or each of the buoyancy tanks being connected together with the soft chains in sequence.

4. The wave energy absorption and conversion device according to claim 2, characterized in that the constraint structure is a structure seton the upper part and/or the lower part of the guiding shaft or a certain part of the guiding shaft or a certain part of the construct integrally connected and fixed with the floating body, and the constraint structure or/and the certain part are located above and/or below the damping plate to constrain the movement range of the damping plate in a state that the counteracting mechanism is not loaded.

5. A wave energy power generation system, comprising a wave energy absorption and conversion device and a power generation system (13), the power generation system (13) being arranged at a power output end of the wave energy absorption and conversion device to convert wave energy into electric energy,
   wherein the wave energy absorption and conversion device comprises a floating body (1), a guiding shaft (5) being connected to the bottom of the floating body (1), a damping plate (9) relatively movably sleeving the guiding shaft (5), an upper constraint structure and a lower constraint structure being arranged above and below the damping plate (9) respectively for defining an upper constrain limit and a lower constrain limit of the damping plate (9) respectively to constrain a movement range of the damping plate (9) on the guiding shaft, and the floating body (1) driving the guiding shaft (5) to move up and down together under a wave action so as to relative movement with the damping plate (9) is generated to provide kinetic energy for electric power generation system;
   wherein a buoyancy force of the damping plate (9) is designed to be greater than the total gravity carried thereby, the upward moving trend of the damping plate is counteracted, and the counterweight (14a) is loaded upon the damping plate (9), so that the sum of gravity carried by the damping plate (9) is greater than the sum of buoyancy forces thereof; the damping plate (9) is combined with the counterweight (14a) when moving up to the middle position from the lower end of the movement range thereof, as the opposite acting force of the counterweight (14a) counteracts the redundant buoyancy force of the damping plate (9), i.e., weakens an ascending kinetic energy of a combined body, the combined body stays in the middle position of movement range, i.e., an initial combined position or vicinity, so that under a certain wave height, the damping plate (9) moves majorly within the constrained movement ranges when relative movement is generated between the damping plate and the guiding shaft by waves, the colliding of the damping plate (9) with the upper constraint structure (11a) or the floating body (1) is prevented and the loss of relative movement is prevented as well; and
   a total carried gravity of the damping plate (9) is designed to be greater than the buoyancy force thereof, the downward moving trend of the damping plate is counteracted, and the buoyancy tank (14b) is loaded below the damping plate (9), so that the sum of the buoyancy forces of the damping plate (9) gained is greater than the sum of gravities thereby; the damping plate (9) is combined with the buoyancy tank (14b) when moving downward to the middle position from the upper end of the movement range thereof, as an upward acting force of the buoyancy tank (14b) weakens the descending kinetic energy of the combined body, i.e., counteracts redundant gravity of the damping plate, the combined body stays at the middle position of movement range, i.e., the initial combined position or vicinity, so that under a certain wave height, the damping plate (9) moves majorly within the constrained movement ranges when relative movement is generated between the damping plate and the guiding shaft by waves, the colliding of the damping plate (9) with the lower constraint structure (11b) is prevented and the loss of relative movement is prevented as well.

6. The wave energy absorption and conversion device according to claim 5, characterized in that the counterweight (14a) is dangled above the damping plate (9) with a soft chain, the buoyancy tank (14b) is pulled and suspended below the damping plate (9) with a soft chain, and the soft chain is connected with the guiding shaft (5) or a certain part integrated with the guiding shaft (5) and moving together with the guiding shaft; and the soft chain may be at any length, preferably a length enabling the counterweight (14a) or the buoyancy tank (14b) to be located in the middle position of the movement range of the damping plate (9).

7. The wave energy absorption and conversion device according to claim 6, characterized in that the counteracting mechanism (14) adopts a multistage loading way, i.e., a plurality of counterweights (14a) or a plurality of buoyancy tanks (14b) are loaded, each of the counterweights or each of the buoyancy tanks being connected together with the soft chains in sequence; or the counteracting mechanism (14) adopts a mixing and multistage loading way, i.e., either one or more of counterweights (14a) or one or more of buoyancy tanks (14b) are loaded, each of the counterweights or each of the buoyancy tanks being connected together with the soft chains in sequence.

8. The wave energy absorption and conversion device according to claim 6, characterized in that the constraint structure is a structure placed on the upper part and/or the lower part of the guiding shaft or a certain part integrally fixed on the floating body used as the constraint structure, and the structure and the part are located above and/or below the damping plate to constrain the movement range of the damping plate in a state that the counteracting mechanism is not loaded.

9. The wave energy electric power generation system according to claim 5, characterized in that the power generation system (13) is a piston pressurizing water turbine power generation device, comprising a generator (2), a water turbine (4) and a piston pressurizing device,
   wherein the generator (2) is mounted in the floating body (1) and is connected with the water turbine (4) via an energy transfer shaft, and the piston pressurizing device is located below the water surface at the bottom of floating body (1);

the piston pressurizing device comprises a piston sleeve (7) and a piston (8) mounted in fit with the piston sleeve, the guiding shaft (5) passes through the piston sleeve (7) and the piston (8) mounted in fit with the piston sleeve, the piston sleeve is fixed below the floating body (1), the top of the piston sleeve is open, and the water turbine (4) is located in a running water channel (6) located at the top of the piston sleeve (7); and the bottom of the piston (8) is in rigid connection with the damping plate (9), and the plate area of the damping plate (9) is greater than that of the bottom of the piston (8); and when the floating body (1) drives the piston sleeve (7) and the guiding shaft (5) to move up and down following the waves, the piston (8) and the piston sleeve (7) are keeping in relative movement due to a synergistic effect of the counteracting mechanism of the piston (8) and the damping plate (9) so as to alternatively produce positive pressure and negative pressure in the inner cavity of the piston sleeve (7), so that the seawater flows back and forth in the running water channel (6) to impact blades of the water turbine (4) in the running water channel (6) back and forth, and therefore, the rotating blades drive the generator (2) to generate electricity.

10. The wave energy power generation system according to claim 5, characterized in that the power generation mechanism (13) is an oil pump hydraulic motor power generation device which comprises a hydraulic pump (16), a hydraulic motor (17) and a generator (2) mounted in the floating body (1), wherein a push rod (15) of the hydraulic pump (16) is connected with the damping plate (9) via a transmission piece (3), the floating body (1) and the damping plate (9) generate a relative movement under the action of the waves, a piston in the hydraulic pump (16) is pushed to move by the transmission piece (3) and the push rod (15), and a liquid in the hydraulic pump pushes the hydraulic motor (17) so as to drive the generator (2) to generate electricity.

11. The wave energy power generation system according to claim 5, characterized in that the power generation mechanism (13) is a linear motor power generation mechanism which comprises a linear motor stator (18), the push rod (15) and a linear motor sliding part (19), wherein the linear motor stator (18) is fixed in the floating body (1), the linear motor sliding part (19) is matched with the linear motor stator (18) and slides relative to the linear motor stator, and the push rod (15) is connected with and drives the linear motor sliding part (19) and is connected with the damping plate (9) via the transmission piece (3); and the floating body (1) and the damping plate (9) generate a relative movement under the action of waves, and the linear motor sliding part (19) is driven by the transmission piece (3) and the push rod (15) to move up and down relative to the linear motor stator (18) so as to generate electric energy.

* * * * *